United States Patent
Liu

(10) Patent No.: US 11,392,619 B2
(45) Date of Patent: Jul. 19, 2022

(54) DATA STORAGE METHOD, DEVICE, SERVER AND STORAGE MEDIUM

(71) Applicant: Shenzhen Intellifusion Technologies Co., Ltd., Guangdong (CN)

(72) Inventor: Guowei Liu, Guangdong (CN)

(73) Assignee: Shenzhen Intellifusion Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/435,044

(22) PCT Filed: Nov. 28, 2019

(86) PCT No.: PCT/CN2019/121606
§ 371 (c)(1),
(2) Date: Aug. 31, 2021

(87) PCT Pub. No.: WO2020/258715
PCT Pub. Date: Dec. 30, 2020

(65) Prior Publication Data
US 2022/0043834 A1    Feb. 10, 2022

(30) Foreign Application Priority Data
Jun. 28, 2019  (CN) .......... 201910580051.9

(51) Int. Cl.
G06F 16/28     (2019.01)
G06T 7/136     (2017.01)
G06F 16/583    (2019.01)
G06F 16/22     (2019.01)
G06F 16/25     (2019.01)
G06F 16/21     (2019.01)

(52) U.S. Cl.
CPC .......... *G06F 16/283* (2019.01); *G06F 16/213* (2019.01); *G06F 16/2282* (2019.01); *G06F 16/25* (2019.01); *G06F 16/583* (2019.01); *G06T 7/136* (2017.01)

(58) Field of Classification Search
CPC ..... G06F 16/51; G06F 16/583; G06F 16/5866
USPC ....................................... 707/736
See application file for complete search history.

(56) References Cited

U.S. PATENT DOCUMENTS

2016/0212437 A1*   7/2016  Tsukuba .......... H04N 19/44

FOREIGN PATENT DOCUMENTS

CN         109513211 A     3/2019

* cited by examiner

*Primary Examiner* — Hung T Vy

(57) ABSTRACT

Provided are a data storage method, a storage device, a server and a storage medium, the method includes: obtaining, by a server, image data of different dimensions (S11); according to the association identity carried by each of the image data, determining, by the server, the image data of the different dimensions with the same association identity as association data (S12); sending the image data of the different dimensions included in the association data to target data tables of databases with different dimensions for storage, respectively (S13), wherein, the databases of different dimensions are located in the same storage apparatus, regarding the target data tables of the database of different dimensions, the table name prefixes of the target data tables are different, but the table name suffixes are the same. This method can store image data in association, meanwhile, when performing associated query, the loss of associated data can be avoided.

7 Claims, 2 Drawing Sheets

Obtaining, by a server, image data of different dimensions — S11

According to association identity carried by each of the image data, determining, by the server, the image data of the different dimensions and a same association identity, as association data — S12

Sending, by the server, the image data of the different dimensions included in the association data to target data tables of databases with different dimensions for storage, respectively — S13

DATA STORAGE METHOD, DEVICE, SERVER AND STORAGE MEDIUM

This application claims priority to Chinese Patent Application No. 201910580051.9, entitled "DATA STORAGE METHOD AND DEVICE, SERVER AND STORAGE MEDIUM" and filed on Jun. 28, 2019, the content of which is hereby incorporated by reference in its entirety.

1. Technical Field

The present disclosure generally relates to image processing technologies field, and especially relates to a data storage method, a device, a server and a storage medium.

2. Description of Related Art

In different search methods (for example, texts, voices and images etc.), information content of an image search method is the most abundant. At the same time, requirements for image search are diverse and unpredictable. A main performance is that different users often have different search requirements when searching for a same image, some users want to search faces in the image, some want to search human bodies in the image, some want to search objects (such as cars) in the image, etc., such requirements of the users can be called as search dimensions.

At present, a conventional search system is only configured to search an image according to a single dimension, and image data with different dimensions are disorderly stored in different locations. However, in practical applications, an association dimension search is usually needed. For example, users generally want to search a human body image related to a face when searching a face image. Because above shortcomings of the current search system, when searing images, it is easy to lose association data in a process of association query.

Therefore, how to perform association storage on the image data is an urgent technical problem to be solved.

SUMMARY

The technical problems to be solved: in view of the shortcomings of the related art, the present disclosure relates to a data storage method, a device, a server and a storage medium which can perform association storage on image data.

In a first aspect, a data storage method according to an embodiment of the present disclosure includes:
  obtaining image data of different dimensions;
  according to an association identity carried by each of the image data, determining the image data of the different dimensions with a same association identity as association data; and
  sending the image data of the different dimensions included in the association data to target data tables of databases with different dimensions for storage, respectively; wherein, the databases with different dimensions are located in a same storage device, for the target data tables of the databases with different dimensions, the target data tables have different table name prefixes and same table name suffixes.

In a possible implementation, after obtaining the image data of different dimensions, and before according to an association identity carried by each of the image data, determining the image data of the different dimensions with the same association identity as association data, the method further includes:
  recording a total number of the image data of each dimension, respectively;
  determining whether a target total number exceeding a preset quantity threshold is existed in the total number;
  if the target total number exceeding the preset quantity threshold is existed in the total number, according to the preset quantity threshold, segmenting the image data of the dimension corresponding to the target total number;
  creating a sub-table for the image data of the different dimensions, respectively, according to number of segmented image data, wherein, the target data table is included in the sub-table, for the sub-table corresponding to the image data of the same dimension, table name suffixes of the sub-table are gradually increased.

In a possible implementation, the method further includes:
  when new additional image data is received, obtaining a first dimension and a first association identity carried by the new additional image data;
  determining whether a dimension consistent with the first dimension is existed in a plurality of dimensions of current storage image data;
  if the dimension consistent with the first dimension is existed in the plurality of dimensions of the current storage image data, determining whether an association identity consistent with the first association identity is existed in a plurality of association identities of the first dimension;
  if the association identity consistent with the first association identity is existed in the plurality of association identities of the first dimension, determining a first storage device corresponding to the first association identity and a first table name suffix corresponding to the first association identity; and
  according to the first table name suffix, sending the new additional image data to a preset data table of a database matched with the first dimension in the first storage device for storage.

In a possible implementation, the method further includes:
  if a dimension consistent with the first dimension isn't existed in the plurality of dimensions of the current storage image data, obtaining a second dimension associated with the first dimension;
  creating a first data table for the first dimension and a second data table for the second dimension; and
  sending the new additional image data to the first data table.

In a possible implementation, the method further includes:
  if an association identity consistent with the first association identity isn't existed in a plurality of association identities of the first dimension, determining whether number of the image data in the data table corresponding to a maximum table name suffix of the first dimension is reached the preset quantity threshold;
  if the number of the image data in the data table corresponding to the maximum table name suffix of the first dimension isn't reached the preset quantity threshold, sending the new additional image data to the data table corresponding to the maximum table name suffix of the first dimension; or
  if the number of the image data in the data table corresponding to the maximum table name suffix of the first dimension is reached the preset quantity threshold, creating a new data table for the new additional image data according to the maximum table name suffix; and sending the new additional image data to the new data table for storage.

In a possible implementation, the method further includes:

receiving an input association query request, the association query request configured to carry a target image, a target dimension and association dimensions;

according to the target dimension and a preset similarity threshold, performing image search on the target image to obtain a search image;

obtaining a second association identity of the search image;

according to a second table name suffix corresponding to the second association identity, and the association dimensions, querying associated image data related to the image data of the search image; and displaying an associated image corresponding to the associated image data.

In a possible implementation, the step of according to a second table name suffix corresponding to the second association identity, and the association dimensions, querying the associated image data related to the image data of the search image, includes:

according to the association dimensions, determining an association database matched with the association dimensions;

according to the second association identity, determining the second table name suffix of the data table stored by the image data of the search image;

querying an associated data table same as the second table name suffix, from the associated database;

according to the second association identity, querying the associated image data related to the image data of the search image, from the associated data table.

In a second aspect, a data storage device according to an embodiment of the present disclosure includes:

an obtaining module configured to obtain image data of different dimensions;

a determining module configured to: according to an association identity carried by each of the image data, determine the image data of the different dimensions with a same association identity as association data; and a sending storage module configured to send the image data of the different dimensions included in the association data to target data tables of databases with different dimensions for storage, respectively; wherein, the databases with different dimensions are located in a same storage device, for the target data tables of the databases with different dimensions, the target data tables have different table name prefixes and same table name suffixes.

In a third aspect, a server according to an embodiment of the present disclosure includes a processor and a memory configured to store computer programs, the computer programs performed by the processor to implement the data storage method in the first aspect.

In a fourth aspect, a computer program according to an embodiment of the present disclosure includes computer programs performed by a processor to implement the data storage method in the first aspect.

According to the above technical scheme, in an embodiment of the present disclosure, when the image data of different dimensions are obtained, the image data of different dimensions with the same association identity can be determined as associated data according to the association identity carried by each of the image data. Furthermore, the image data of different dimensions included in the associated data are separately sent to target data tables of databases of different dimensions for storage, wherein, the databases with different dimensions are located in a same storage device, for the target data tables of the databases with different dimensions, the target data tables have different table name prefixes and same table name suffixes. It can be seen that, in an embodiment of the present disclosure, the table name suffixes of the data table stored by the image data with association identity are same so as to realize data association, the image data of different dimensions with association identity is stored in the same storage device, so as to realize association storage of the image data. Therefore, for subsequent association queries, the present disclosure can avoid the loss of associated data and improve performances of associated query.

Beneficial Effect

BRIEF DESCRIPTION OF THE DRAWINGS

Description of the Drawings

In order to more clearly understand the technical solution hereinafter in embodiments of the present disclosure, a brief description to the drawings used in detailed description of embodiments hereinafter is provided thereof.

Figure 1:
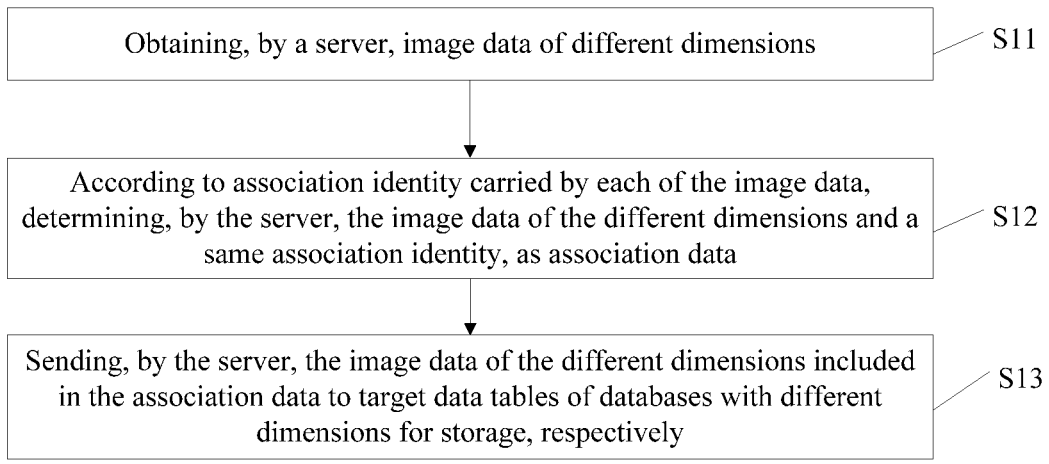

FIG. 1 is a flowchart of a data storage method in accordance with an embodiment of the present disclosure.

Figure 2:
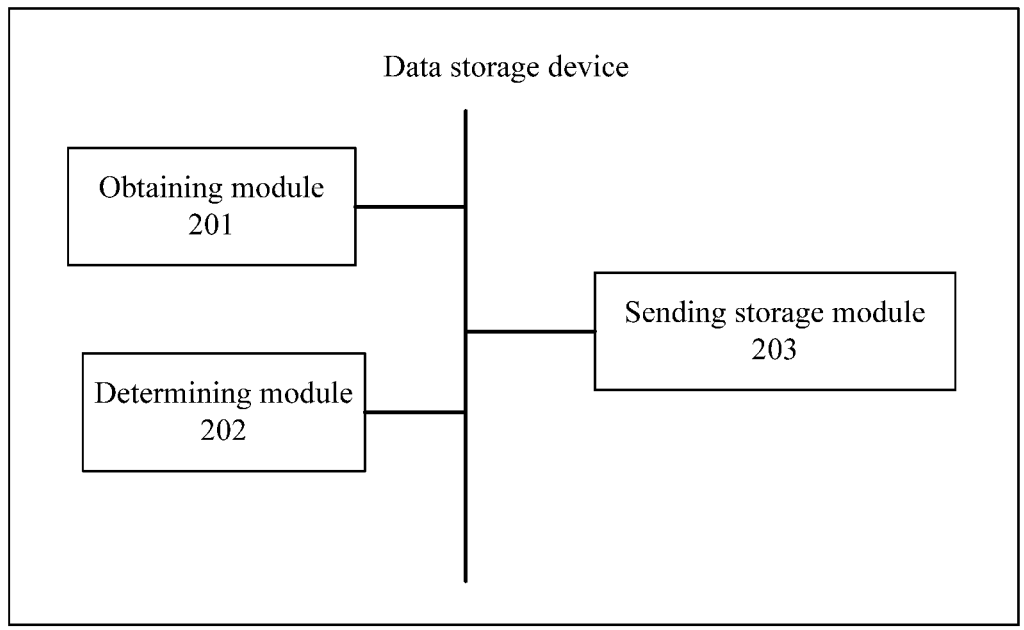

FIG. 2 is a block diagram of a data storage device in accordance with an embodiment of the present disclosure.

Figure 3:
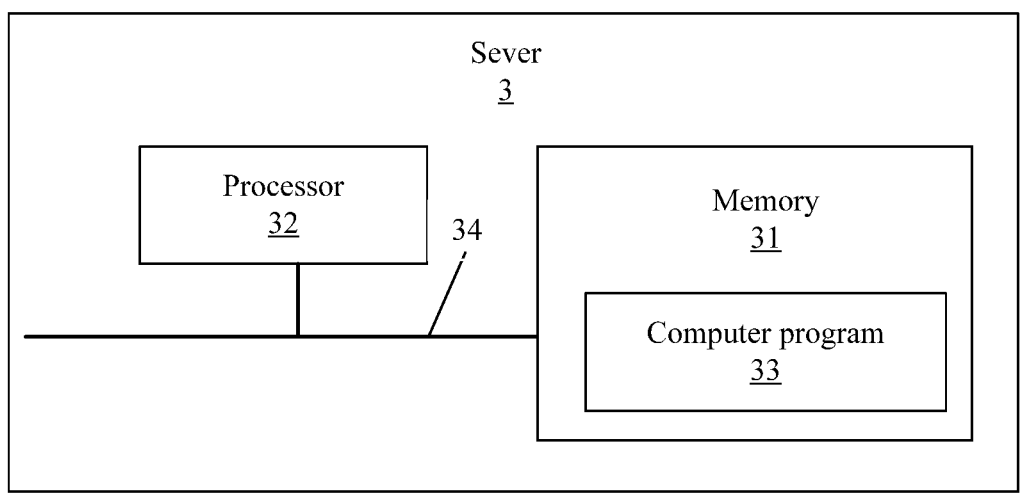

FIG. 3 is a schematic diagram of a server for implementing the data storage method in accordance with an embodiment of the present disclosure.

EMBODIMENTS

Detailed Description

FIG. 1 illustrates a flowchart of a data storage method in accordance with an embodiment of the present disclosure. According to different requirements, a sequence of steps in the flowchart can be changed and some steps can be omitted.

Step S11, obtaining, by a server, image data of different dimensions.

Furthermore, dimensions of the image data are different according to different search requirements of users, such as faces, human bodies, vehicles or other dimensions.

Furthermore, the server is a back-end device, and a front-end device (such as a camera) can be configured to capture various images and extract image data of different dimensions from the various images and then send the image data of different dimensions to the back-end device, namely the server. For example, it is assumed that a image including a face, a human body, and a vehicle is captured by the front-end device, and then image data of the face, image data of the human body, and image data of the vehicle are extracted from the image and then sent to the server. Understandably, the server can be also configured to store a variety of images captured by the front-end device, and each image has a corresponding relationship with the image data of different dimensions extracted from the image (that is, the image data of different dimensions extracted from an image A can be found according to the image A).

Furthermore, the image data obtained by the server can be come from a plurality of images and a plurality of different dimensions. Each image can include more than one person and more than one object, which is not limited in embodiments of the present disclosure.

Furthermore, when the front-end device captures the image, it is already determined which dimensions is included in the image and which dimensions of the image are related to each other, and then it is adopted an association identity way to perform association identity on the image data with association identity.

For example, in a video stream captured by the camera, for a current captured image, the camera can be configured to perform video screenshot on the video stream according to a row of image of every few frames to determine which dimensions of the image are relevant. For example, the face and the body of the same person are belonged to two dimensions related to each other, or for a driver, the face of the driver and a license plate of the car driven by the driver are belonged to two dimensions related to each other.

It is understandable that the back-end device (such as the server) can also process an image captured by the front-end device to determine which dimensions are included in the image and which dimensions of the image are related to each other, and then, the associated identify is used to identify associated image data. At this point, the front-end device is only responsible for capturing images.

Furthermore, image data of different dimensions is associated that is mainly considered two factors: 1. whether the image data of different dimensions comes from the same image; 2. whether the image data of different dimensions are belonged to a whole. For example, the face of a user A from a first image is not associated with the body of the user A from a second image, another example: the face of the user A is associated with the body of the user A from the same image, while the face of the user A is not associated with the body of a user B from the same image. Another example: the face of a driver A is associated with the license plate of the car driven by the driver A from the same image, while the face of a passenger A is not associated with the license plate of the car that the passenger A is in, from the same image.

Typically, two image data associated with each other are marked with the same association identity that are configured to identify a plurality of image data associated therebetween, a number of fields can be used for each association identity to identify which dimensions belonged by the image data and associations between the image data.

Step S12, according to the association identity carried by each of the image data, determining, by the server, the image data of the different dimensions with the same association identity as association data.

Furthermore, the image data received by the server has different dimensions, some which are associated with each other, and some of which are not. The server can be configured to distinguish according to the association identity carried by each of the image data, that is, according to the association identity, the image data of different dimensions with the same association identity can be determined as the association data. Furthermore, the image data of different dimensions determined as the associated data are associated, the association identity is same. For example, if the image data of the face, the image data of the body and the image data of the vehicle have the same association identify, the image data of the face, the image data of the body and the image data of the vehicle can be determined as the associated data.

As an optional embodiment, after the step S11 and before the step S12, the method further includes:
recording a total number of the image data of each dimension, respectively;
determining whether a target total number exceeding a preset quantity threshold is existed in the total number;
if the target total number exceeding the preset quantity threshold is existed in the total number, according to the preset quantity threshold, segmenting the image data of the dimension corresponding to the target total number;
creating a sub-table for the image data of the different dimensions, respectively, according to number of segmented image data, wherein, the target data table is included in the sub-table, for the sub-table corresponding to the image data of the same dimension, table name suffixes of the sub-table are gradually increased.

In the optional embodiment, the server is configured to obtain the image data of different dimensions, and the total number of the image data from each dimension can be different. In order to improve query performance of the image data of a single dimension, the image data corresponding to the total number exceeding the preset quantity threshold should be stored in separate tables to improve query efficiency.

The preset quantity threshold can be set, such as three million, that is, a data table is configured to store three million image data at most. The server can be configured to record the total number of the image data in each dimension, for example, the total number of the image data of the face is A, the total number of the image data of the body is B, and the total number of the image data of the vehicle is C. Furthermore, it is determined whether the target total number exceeding the preset quantity threshold is existed in the total number, that is, A, B and C are respectively compared with the preset quantity threshold, if the target total number exceeding the preset quantity threshold is existed in the total number, for example, A exceeds the preset quantity threshold, or B exceeds the preset quantity threshold, or C exceeds the preset quantity threshold. As long as any one or two or three of them meet the conditions, the image data of the dimensions corresponding to the total target number can be segmented according to the preset quantity threshold, and sub-tables can be respectively created for the image data of different dimensions in the associated data according to the number of segmented image data.

Furthermore, the number of sub-tables created by the image data of different dimensions in the associated data is same, for the sub-table corresponding to the image data of each dimension, table name suffixes of the sub-table are gradually increased.

For example, it is assumed that the total number of the image data of the face included in the associated data is A, the total number of the image data of the body is B, and the total number of the image data of the vehicle is C, wherein, A is exceeded the preset quantity threshold, but B and C are not exceeded the preset quantity threshold, so, the image data of the face can be segmented according to the preset quantity threshold. It is assumed that number of segmented image data is N, number of a first segmented image data, number of a second segmented image data, . . . , number of a (N−1)-th segmented image data all are exceeded the preset quantity threshold, number of a N-th segmented image data isn't exceeded the preset quantity threshold, in this way, N sub-tables can be created for the image data of the face, such as a sub-table feature_face_1, a sub-table feature_face_2, . . . , a sub-table feature_face_N. Wherein, for the table feature_face_1, the feature_face is a prefix of the table name, and 1 is a suffix of the table name, for the sub-tables corresponding to the image data of the same dimension, prefixes of the table name are same, and suffixes of the table name is gradually increased. Similarly, N sub-tables need to be created for the image data of the body, such as a sub-table feature_body_1, a sub-table feature_body_2, . . . , a sub-table feature_body_N, it is also needed to create N sub-tables for the image data of the vehicle, such as a sub-table feature_car_1, a sub-table feature_car_2, . . . , a sub-table feature_car_N.

Furthermore, current image data of different dimensions are stored in different databases, for example, the image data of the face is stored in a database of face dimensions, and the image data of the body is stored in a database of body dimensions. By using different prefixes, it is simple to distinguish which database is configured to store faces and which database is configured to store bodies. A database can be configured to store a plurality of data tables, by using different suffixes, in subsequent queries, the table can be located in which the data needed to be queried is stored.

It should be noted that even if only A is exceeded the preset quantity threshold, both B and C aren't exceeded the preset quantity threshold, it is still necessary to create sub-tables of the same number for the image data of the three different dimensions. Furthermore, the sub-tables corresponding to the image data of the body dimension and the sub-tables corresponding to the image data of the vehicle dimension may be null values, but it is needed to create sub-tables, which is conducive to subsequent image data with body dimensions or vehicle dimensions for being come in, at that time, the table does not need to be recreated, but can be stored directly.

Step S13, sending the image data of the different dimensions included in the association data to target data tables of databases with different dimensions for storage, respectively.

Wherein, the target data table can be any of the sub-tables mentioned in the optional embodiment above.

Furthermore, the image data of different dimensions are stored in databases of different dimensions, for example, the image data of the face is stored in the database of the face dimension, the image data of the body is stored in the database of the body dimension, and the image data of the vehicle is stored in the database of the vehicle dimension. The databases of the different dimensions are located in the same storage device, which is conducive to avoid the loss of the associated data for subsequent queries in the same storage device. For the target data table of the database with different dimensions, the target data table has different prefixes and the same suffixes of the table name. When the image data of different dimensions with the same association identity is stored, the same table name suffix is set, which can improve a query speed in subsequent association queries. For example, if the image data of the queried face is stored in the sub-table feature_face_5 of the face dimension database, the image data of the body associated with the image data of the queried face is stored in the sub-table feature_body_5 of the body dimension database, and the image data of the vehicle associated with the image data of the queried face is stored in the sub-table feature_car_5 of the vehicle dimension database.

As an optional embodiment, the method further includes:
when new additional image data is received, obtaining a first dimension and a first association identity carried by the new additional image data;
determining whether a dimension consistent with the first dimension is existed in a plurality of dimensions of current storage image data;
if the dimension consistent with the first dimension is existed in the plurality of dimensions of the current storage image data, determining whether an association identity consistent with the first association identity is existed in a plurality of association identities of the first dimension;
if the association identity consistent with the first association identity is existed in the plurality of association identities of the first dimension, determining a first storage device corresponding to the first association identity and a first table name suffix corresponding to the first association identity; and
according to the first table name suffix, sending the new additional image data to a preset data table of a database matched with the first dimension in the first storage device for storage.

In the optional embodiment, the new additional image data can be received at any time subsequently. The first dimension of the new additional image data can be same as or different from the dimension of the current storage image data, for example, dimensions of the current storage image data include faces, bodies and vehicles. The first dimension of the new additional image data can be any one or more of the faces, the bodies and the vehicles, as well as other dimensions, such as animals. The first association identity of the new additional image data can be same as or different from the association identity of the current storage image data, in other words, the new additional image data can be associated or unassociated with the current storage image data.

The server is configured to first determine whether the dimension consistent with the first dimension is existed in the plurality of dimensions of the current storage image data. If the dimension consistent with the first dimension is existed in the plurality of dimensions of the current storage image data, it is indicated that a dimension database associated with the first dimension is already existed, obtaining a plurality of association identities corresponding to the first dimension from the database, and determining whether an association identity consistent with the first association identity is existed in the plurality of association identities of the first dimension. If the association identity consistent with the first association identity is existed in the plurality of association identities of the first dimension, it is indicates that the new additional image data is associated with the current storage image data, and related data tables are created. In this way, determining a first storage device corresponding to the first association identity and a first table name suffix corresponding to the first association identity; and then, according to the first table name suffix, sending the new additional image data to a preset data table of a database matched with the first dimension in the first storage device for storage.

As an optional embodiment, the method further includes:
if the dimension consistent with the first dimension isn't existed in the plurality of dimensions of the current storage image data, obtaining a second dimension associated with the first dimension;
creating a first data table for the first dimension and a second data table for the second dimension; and
sending the new additional image data to the first data table.

In the optional embodiment, if the dimension consistent with the first dimension isn't existed in the plurality of dimensions of the current storage image data, it is indicated that the dimension database associated with the first dimension isn't existed, and related data tables aren't existed. At the same time, it is indicates that the new additional image data is unassociated with the current storage image data, the second dimension associated with the first dimension can be obtained from the front-end device or a local device, the first data table for the first dimension and the second data table for the second dimension are respectively created; and sending the new additional image data to the first data table. Wherein, when a new table is created, a database of new dimensions is created accordingly.

As an optional embodiment, the method further includes:
   if the association identity consistent with the first association identity isn't existed in the plurality of association identities of the first dimension, determining whether number of the image data in the data table corresponding to a maximum table name suffix of the first dimension is reached the preset quantity threshold;
   if the number of the image data in the data table corresponding to the maximum table name suffix of the first dimension isn't reached the preset quantity threshold, sending the new additional image data to the data table corresponding to the maximum table name suffix of the first dimension; or
   if the number of the image data in the data table corresponding to the maximum table name suffix of the first dimension is reached the preset quantity threshold, creating a new data table for the new additional image data according to the maximum table name suffix; and sending the new additional image data to the new data table for storage.

In the optional embodiment, if the dimension consistent with the first dimension is existed in the plurality of dimensions of the current storage image data, and if the association identity consistent with the first association identity isn't existed in the plurality of association identities of the first dimension, it is indicated that the dimension database associated with the first dimension is already existed, but the new additional image data is unassociated with the current storage image data, it can't be stored based on the associated data table. It is needed to determine whether the number of the image data in the data table corresponding to the maximum table name suffix of the first dimension is reached the preset quantity threshold, if the number of the image data in the data table corresponding to the maximum table name suffix (that is the last table) of the first dimension isn't reached the preset quantity threshold, sending the new additional image data to the data table corresponding to the maximum table name suffix of the first dimension, otherwise, if the number of the image data in the data table corresponding to the maximum table name suffix (that is the last table) of the first dimension is reached the preset quantity threshold, it is needed to create the new data table for the new additional image data according to the maximum table name suffix, for example, the maximum table name suffix is N, the new data table will have the table name suffix (N+1); and then sending the new additional image data to the new data table for storage.

It should be noted that when the image data is stored, the same data table of the same dimension, such as the data table feature_face_1 of the face, can be configured to store a plurality of face data. However, these face data can be come from a plurality of images of the same person or from different people in the same image, that is, a plurality of different association identifies can be included in the same data table. The data table isn't limited during storing the image data and is only divided just according to the preset quantity threshold (such as 3 million image data per table), the new additional data is constantly stored in a latest table, that is, the table name suffix has no relationship with the association identity, once the data is stored and recorded, a corresponding relationship is formed between the association identity and the table name suffix.

In addition, the association identify is only configured to perform association storage on the image data of different dimensions, to the data table with different prefixes and the same suffixes of the table name. For example: face data is already stored in the data table feature_face_56, but when new body data is identified in the data table feature_body_56 by the association identify, then the new body data is stored in the data table feature_body_56 of the body. If the new body data does not have any associated with the face data, the new body data is stored in a current latest body table, regardless of the suffixes of the table name.

As an optional embodiment, the method further includes:
   receiving an input association query request, the association query request configured to carry a target image, a target dimension and association dimensions;
   according to the target dimension and a preset similarity threshold, performing image search on the target image to obtain a search image;
   obtaining a second association identity of the search image;
   according to a second table name suffix corresponding to the second association identity, and the association dimensions, querying associated image data related to the image data of the search image; and
   displaying an associated image corresponding to the associated image data.

In the optional embodiment, when an association query is needed, an association query request can be input in a system interface, wherein the association query request is configured to carry the target image, the target dimension and the association dimension. Specifically, the target image can be uploaded and the target dimension and the association dimension can be input by a variety of ways (such as a text input, a voice input, a click input, and a touch input, etc.). Furthermore, the system can be a device with association query functions, which can include but not limited to a camera engine, a search engine, a page display system and other components.

It is performed image search on the target image by the system, first according to the target dimension (such as faces), and search images with similarity greater than or equal to the preset similarity threshold (such as 92%) can be found. And then, querying the second association identity corresponding to the search image from a corresponding database to obtain the second association identity for each of the search images. The second association identity can be used to perform an association query on the image data of the associated dimensions. Furthermore, according to the second table name suffix corresponding to the second association identity, and the association dimensions, querying the associated image data related to the image data of the search image; and displaying the associated image corresponding to the associated image data.

Specifically, the step of according to the second table name suffix corresponding to the second association identity, and the association dimensions, querying the associated image data related to the image data of the search image, includes:

according to the association dimensions, determining an association database matched with the association dimensions;

according to the second association identity, determining the second table name suffix of the data table stored by the image data of the search image;

querying an associated data table same as the second table name suffix, from the associated database;

according to the second association identity, querying the associated image data related to the image data of the search image, from the associated data table.

Furthermore, it is assumed that the target dimension is to be a face, and the association dimension is a body, then, according to the association dimension, the association database matched with the association dimension can be determined as the body dimension database. Wherein, the table name suffix of the data table that is configured to store the image data of different dimensions included in the associated data is same. According to the second association identity, determining the second table name suffix of the data table stored by the image data of the search image; querying the associated data table same as the second table name suffix, from the associated database. After the associated data table is determined, according to the second association identity, querying the associated image data related to the image data of the search image, from the associated data table.

For example, it is assumed that the second table name suffix of the data table for storing the image data of the face is 5, when querying the image data of the associated body, the table name suffix of the associated data table for storing the image data of the body is also 5, that is, the image data of the face is stored in the data table feature_face_5, and the image data of the body is stored in the data table feature_body_5, in this way, according to the second association identify, querying the associated image data in the associated data table (for example, the data table feature_body_5) with the table name suffix of 5.

In the method described in FIG. 1, when the image data of different dimensions are obtained, the image data of different dimensions with the same association identity can be determined as associated data according to the association identity carried by each of the image data. Furthermore, the image data of different dimensions included in the associated data are separately sent to target data tables of databases of different dimensions for storage, wherein, the databases with different dimensions are located in a same storage device, for the target data tables of the databases with different dimensions, the target data tables have different table name prefixes and same table name suffixes. It can be seen that, in an embodiment of the present disclosure, the table name suffixes of the data table stored by the image data with association identity are same so as to realize data association, the image data of different dimensions with association identity is stored in the same storage device, so as to realize association storage of the image data. Therefore, for subsequent association queries, the present disclosure can avoid the loss of associated data and improve performances of associated query.

The above is only specific implementations of the present disclosure, but not intended to limit the protection scope of the present disclosure. Any variation or replacement made by one of ordinary skill in the related art without departing from the spirit of the present disclosure shall fall within the protection scope of the present disclosure.

FIG. 2 illustrates a block diagram of a data storage device in accordance with an embodiment of the present disclosure.

In some embodiments of the present disclosure, the data storage device is operated in the server and can include a plurality of functional modules composed of program code segments. Program codes of each program segment in the data storage device can be stored in a memory and performed by at least one processor to implement some or all of the steps of the data storage method described in FIG. 1. Details are shown in relevant descriptions of the data storage method shown in FIG. 1, which is not repeated here.

In an embodiment of the present disclosure, the data storage device can be divided into a plurality of functional modules according to functions performed by the data storage device. The plurality of functional modules can include: an obtaining module 201, a determining module 202 and a sending storage module 203. The modules of the present disclosure are referred to a series of computer program segments performed by the at least one processor to implement fixed functions, and stored in the memory. In some embodiments, the functions of each module are detailed in subsequent embodiments.

The obtaining module 201 is configured to obtain image data of different dimensions.

The determining module 202 is configured to: according to an association identity carried by each of the image data, determine the image data of the different dimensions with the same association identity as association data.

The sending storage module 203 is configured to send the image data of the different dimensions included in the association data to target data tables of databases with different dimensions for storage, respectively, wherein, the databases with different dimensions are located in a same storage device, for the target data tables of the databases with different dimensions, the target data tables have different table name prefixes and same table name suffixes.

Optionally, the data storage device further includes:

a recording module configured to: after the obtaining module 201 is configured to obtain the image data of different dimensions, and before the determining module 202 configured to determine the image data of the different dimensions with the same association identity as the association data, according to the association identity carried by each of the image data, record a total number of the image data of each dimension, respectively;

a judging module configured to determine whether a target total number exceeding a preset quantity threshold is existed in the total number;

a segmenting module configured to: if the target total number exceeding the preset quantity threshold is existed in the total number, segment the image data of the dimension corresponding to the target total number, according to the preset quantity threshold;

a creating module configured to create a sub-table for the image data of the different dimensions, respectively, according to number of segmented image data, wherein, the target data table is included in the sub-table, for the sub-table corresponding to the image data of the same dimension, table name suffixes of the sub-table are gradually increased.

Optionally, the obtaining module 201 is further configured to: when new additional image data is received, obtain a first dimension and an association identity of the new additional image data;

the judging module further configured to determine whether a dimension consistent with the first dimension is existed in a plurality of dimensions of current storage image data;

the judging module further configured to: if the dimension consistent with the first dimension is existed in the plurality of dimensions of the current storage image data, determine whether an association identity consistent with the first association identity is existed in a plurality of association identities of the first dimension;

the determining module 202 further configured to: if the association identity consistent with the first association identity is existed in the plurality of association identities of the first dimension, determining a first storage device corresponding to the first association identity and a first table name suffix corresponding to the first association identity;

the sending storage module 203 further configured to: according to the first table name suffix, send the new additional image data to a data table of a database matched with the first dimension in the first storage device for storage.

Optionally, the obtaining module 201 is further configured to: if the dimension consistent with the first dimension isn't existed in the plurality of dimensions of the current storage image data, obtain a second dimension associated with the first dimension;

the creating module further configured to create a first data table for the first dimension and a second data table for the second dimension;

the sending storage module 203 further configured to send the new additional image data to the first data table.

Optionally, the judging module is further configured to: if the association identity consistent with the first association identity isn't existed in the plurality of association identities of the first dimension, determine whether number of the image data in the data table corresponding to a maximum table name suffix of the first dimension is reached the preset quantity threshold;

the sending storage module 203 further configured to: if the number of the image data in the data table corresponding to the maximum table name suffix of the first dimension isn't reached the preset quantity threshold, send the new additional image data to the data table corresponding to the maximum table name suffix of the first dimension;

the creating module further configured to: if the number of the image data in the data table corresponding to the maximum table name suffix of the first dimension is reached the preset quantity threshold, create a new data table for the new additional image data;

the sending storage module 203 further configured to send the new additional image data to the new data table for storage.

Optionally, the data storage device further includes:

a receiving module configured to receive an input association query request, the association query request configured to carry a target image, a target dimension and association dimensions;

a searching module configured to: according to the target dimension and a preset similarity threshold, perform image search on the target image to obtain a search image;

the obtaining module 201 further configured to obtain a second association identity of the search image;

a querying module configured to: according to a second table name suffix corresponding to the second association identity, and the association dimensions, query associated image data related to the image data of the search image;

a displaying module configured to display an associated image corresponding to the associated image data.

Specifically, the querying module configured to: according to the second table name suffix corresponding to the second association identity, and the association dimensions, query the associated image data related to the image data of the search image, includes:

the querying module configured to: according to the association dimension, determine an association database matched with the association dimension;

the querying module configured to: according to the second association identity, determine the second table name suffix of the data table stored by the image data of the search image;

the querying module configured to: query an associated data table same as the second table name suffix, from the associated database;

the querying module configured to: according to the second association identity, query the associated image data related to the image data of the search image, from the associated data table.

In the data storage device described in FIG. 2, the table name suffixes of the data table stored by the image data with association identity are same so as to realize data association, the image data of different dimensions with association identity is stored in the same storage device, so as to realize association storage of the image data. Therefore, for subsequent association queries, the present disclosure can avoid the loss of associated data and improve performances of associated query.

FIG. 3 illustrates a schematic diagram of a server for implementing the data storage method in accordance with an embodiment of the present disclosure. The server 3 includes a memory 31, at least one processor 32, a computer program 33 stored in the memory 31 and performed by the at least one processor 32, and at least one communication bus 34.

One of ordinary skill in the related art can be understood that the schematic diagram shown in FIG. 3 is only an example of the server 3 but not intended to limit the server 3. The server 3 can include more or fewer parts than the figures, or some combination of the parts, or different parts. For example, the server 3 can also include input/output devices, network access devices, and so on.

The server 3 can also include, but is not limited to, any electronic product that can interact with users by means of a keyboard, a mouse, a remote control, a touch pad or a voice-controlled device, for example, personal computers, tablets, smartphones, personal digital assistants (PDAs), game consoles, Internet Protocol Televisions (IPTVs), smart wearable devices, and so on. The Network where the server 3 is located includes, but is not limited to Internet, wide area Network, Metropolitan area network, local area Network, Virtual Private Network (VPN), etc.

The at least one processor 32 can be a Central Processing Unit (CPU), and other general purpose processors, Digital Signal Processors (DSP), Application Specific Integrated circuits (ASIC), ready-made Programmable Gate Array (FIELD-Programmable Gate Array, FPGA), or other programmable logic devices, discrete gate or transistor logic devices, discrete hardware components, etc. The processor 32 can be a microprocessor or any conventional processor, etc. The processor 32 is a control center of the server 3 to connect various parts of the entire server 3 with various interfaces and wires.

The memory 31 is configured to store the computer programs 33 and/or modules/cells, the processor 32 is configured to perform the computer programs and/or modules/ units stored in the memory 31 and call data stored in the memory 31 to implement various functions of the server 3. The storage 31 can mainly include a storage program area and a storage data area, wherein the storage program area is configured to store an operation system, applications required by at least one function (such as a sound playing function, an image playing function, etc.); the storage data area is configured to store data created by the sever 3 according to usage of the server 3 (such as audio data, phone books, etc.), and so on. In addition, the memory 31 can include a high-speed random access memory and a non-volatile memory, for example, hard disks, memories, plug-in hard disks, Smart Media Cards (SMC), Secure Digital (SD) Cards, Flash Cards, at least one disk storage device, Flash memory devices, or other volatile solid state storage devices.

Combined with FIG. 1, the memory 31 in the server 3 is configured to store a plurality of instructions to implement a data storage method, and the processor 32 is configured to perform the plurality of instructions to implement:
  obtain image data of different dimensions;
    according to an association identity carried by each of the image data, determine the image data of the different dimensions with a same association identity as association data;
    send the image data of the different dimensions included in the association data to target data tables of databases with different dimensions for storage, respectively; wherein, the databases with different dimensions are located in a same storage device, for the target data tables of the databases with different dimensions, the target data tables have different table name prefixes and same table name suffixes.

In an optional embodiment, after obtaining the image data of different dimensions, and before according to an association identity carried by each of the image data, determining the image data of the different dimensions with the same association identity as association data, the processor 32 is configured to perform the plurality of instructions to implement:
  record a total number of the image data of each dimension, respectively;
  determine whether a target total number exceeding a preset quantity threshold is existed in the total number;
  if the target total number exceeding the preset quantity threshold is existed in the total number, according to the preset quantity threshold, segment the image data of the dimension corresponding to the target total number;
  create a sub-table for the image data of the different dimensions, respectively, according to number of segmented image data, wherein, the target data table is included in the sub-table, for the sub-table corresponding to the image data of the same dimension, table name suffixes of the sub-table are gradually increased.

In an optional embodiment, the processor 32 is configured to perform the plurality of instructions to implement:
  when new additional image data is received, obtain a first dimension and a first association identity carried by the new additional image data;
  determine whether a dimension consistent with the first dimension is existed in a plurality of dimensions of current storage image data;
  if the dimension consistent with the first dimension is existed in the plurality of dimensions of the current storage image data, determine whether an association identity consistent with the first association identity is existed in a plurality of association identities of the first dimension;
  if the association identity consistent with the first association identity is existed in the plurality of association identities of the first dimension, determine a first storage device corresponding to the first association identity and a first table name suffix corresponding to the first association identity;
  according to the first table name suffix, send the new additional image data to a preset data table of a database matched with the first dimension in the first storage device for storage In an optional embodiment, the processor 32 is configured to perform the plurality of instructions to implement:
  if the dimension consistent with the first dimension isn't existed in the plurality of dimensions of the current storage image data, obtain a second dimension associated with the first dimension;
  create a first data table for the first dimension and a second data table for the second dimension; and
  send the new additional image data to the first data table.

In an optional embodiment, the processor 32 is configured to perform the plurality of instructions to implement:
  if the association identity consistent with the first association identity isn't existed in the plurality of association identities of the first dimension, determine whether number of the image data in the data table corresponding to a maximum table name suffix of the first dimension is reached the preset quantity threshold;
  if the number of the image data in the data table corresponding to the maximum table name suffix of the first dimension isn't reached the preset quantity threshold, send the new additional image data to the data table corresponding to the maximum table name suffix of the first dimension; or
  if the number of the image data in the data table corresponding to the maximum table name suffix of the first dimension is reached the preset quantity threshold, create a new data table for the new additional image data according to the maximum table name suffix; and send the new additional image data to the new data table for storage.

In an optional embodiment, the processor 32 is configured to perform the plurality of instructions to implement:
  receive an input association query request, the association query request configured to carry a target image, a target dimension and association dimensions;
  according to the target dimension and a preset similarity threshold, perform image search on the target image to obtain a search image;
  obtain a second association identity of the search image;
  according to the second table name suffix corresponding to the second association identity, and the association dimensions, query associated image data related to the image data of the search image; and
  display an associated image corresponding to the associated image data In an optional embodiment, the processor 32 configured to perform the plurality of instructions to implement: according to a second table name suffix corresponding to the second association identity, and the association dimensions, query the associated image data related to the image data of the search image, includes:
  according to the association dimensions, determine an association database matched with the association dimensions;
  according to the second association identity, determine the second table name suffix of the data table stored by the image data of the search image;

query an associated data table same as the second table name suffix, from the associated database;

according to the second association identity, query the associated image data related to the image data of the search image, from the associated data table.

Specifically, specific implementations of the above instructions performed by the processor 32 can be referred to the description of relevant steps in a corresponding embodiment shown in FIG. 1, which is not repeated here.

In the server 3 described in FIG. 3, when the image data of different dimensions are obtained, the image data of different dimensions with the same association identity can be determined as associated data according to the association identity carried by each of the image data. Furthermore, the image data of different dimensions included in the associated data are separately sent to target data tables of databases of different dimensions for storage, wherein, the databases with different dimensions are located in a same storage device, for the target data tables of the databases with different dimensions, the target data tables have different table name prefixes and same table name suffixes. It can be seen that, in an embodiment of the present disclosure, the table name suffixes of the data table stored by the image data with association identity are same so as to realize data association, the image data of different dimensions with association identity is stored in the same storage device, so as to realize association storage of the image data. Therefore, for subsequent association queries, the present disclosure can avoid the loss of associated data and improve performances of associated query.

What is claimed is:

1. A data storage method comprising:
obtaining image data of different dimensions;
according to an association identity carried by each of the image data, determining the image data of the different dimensions with a same association identity as association data;
sending the image data of the different dimensions included in the association data to target data tables of databases with different dimensions for storage, respectively; wherein, the databases with different dimensions are located in a same storage device, for the target data tables of the databases with different dimensions, the target data tables have different table name prefixes and same table name suffixes;
receiving an input association query request, the association query request configured to carry a target image, a target dimension and association dimensions;
according to the target dimension and a preset similarity threshold, performing image search on the target image to obtain a search image;
obtaining a second association identity of the search image;
according to a second table name suffix corresponding to the second association identity, and the association dimensions, querying associated image data related to the image data of the search image; and
displaying an associated image corresponding to the associated image data.

2. The data storage method as claimed in claim 1, wherein after the step of obtaining the image data of different dimensions, and before the step of according to an association identity carried by each of the image data, determining the image data of the different dimensions with the same association identity as association data, the method further comprises:

recording a total number of the image data of each dimension, respectively;

determining whether a target total number exceeding a preset quantity threshold is existed in the total number;

if the target total number exceeding the preset quantity threshold is existed in the total number, according to the preset quantity threshold, segmenting the image data of the dimension corresponding to the target total number;

creating a sub-table for the image data of the different dimensions, respectively, according to number of segmented image data, wherein, the target data table is comprised in the sub-table, for the sub-table corresponding to the image data of the same dimension, table name suffixes of the sub-table are gradually increased.

3. The data storage method as claimed in claim 1, wherein the method further comprises:

when new additional image data is received, obtaining a first dimension and a first association identity carried by the new additional image data;

determining whether a dimension consistent with the first dimension is existed in a plurality of dimensions of current storage image data;

if the dimension consistent with the first dimension is existed in the plurality of dimensions of the current storage image data, determining whether an association identity consistent with the first association identity is existed in a plurality of association identities of the first dimension;

if the association identity consistent with the first association identity is existed in the plurality of association identities of the first dimension, determining a first storage device corresponding to the first association identity and a first table name suffix corresponding to the first association identity; and according to the first table name suffix, sending the new additional image data to a preset data table of a database matched with the first dimension in the first storage device for storage.

4. The data storage method as claimed in claim 3, wherein the method further comprises:

if the dimension consistent with the first dimension isn't existed in the plurality of dimensions of the current storage image data, obtaining a second dimension associated with the first dimension;

creating a first data table for the first dimension and a second data table for the second dimension; and sending the new additional image data to the first data table.

5. The data storage method as claimed in claim 3, wherein the method further comprises:

if the association identity consistent with the first association identity isn't existed in the plurality of association identities of the first dimension, determining whether number of the image data in the data table corresponding to a maximum table name suffix of the first dimension is reached the preset quantity threshold;

if the number of the image data in the data table corresponding to the maximum table name suffix of the first dimension isn't reached the preset quantity threshold, sending the new additional image data to the data table corresponding to the maximum table name suffix of the first dimension; or if the number of the image data in the data table corresponding to the maximum table name suffix of the first dimension is reached the preset quantity threshold, creating a new data table for the new additional image data according to the maximum table name suffix; and sending the new additional image data to the new data table for storage.

6. The data storage method as claimed in claim 1, wherein the step of according to the second table name suffix corresponding to the second association identity, and the association dimensions, querying the associated image data related to the image data of the search image, comprises:

according to the association dimensions, determining an association database matched with the association dimensions;

according to the second association identity, determining the second table name suffix of the data table stored by the image data of the search image;

querying an associated data table same as the second table name suffix, from the associated database;

according to the second association identity, querying the associated image data related to the image data of the search image, from the associated data table.

7. A server comprising a processor and a memory configured to store computer programs, the computer programs performed by the processor to implement a data storage method, the method comprising:

obtaining image data of different dimensions;

according to an association identity carried by each of the image data, determining the image data of the different dimensions with a same association identity as association data; and sending the image data of the different dimensions included in the association data to target data tables of databases with different dimensions for storage, respectively; wherein, the databases with different dimensions are located in a same storage device, for the target data tables of the databases with different dimensions, the target data tables have different table name prefixes and same table name suffixes;

receiving an input association query request, the association query request configured to carry a target image, a target dimension and association dimensions;

according to the target dimension and a preset similarity threshold, performing image search on the target image to obtain a search image;

obtaining a second association identity of the search image;

according to a second table name suffix corresponding to the second association identity, and the association dimensions, querying associated image data related to the image data of the search image; and displaying an associated image corresponding to the associated image data.

* * * * *